INVENTOR:
Martin E. Cupery
Connolly and Hutz
ATTORNEYS

June 27, 1967
M. E. CUPERY
3,328,219
PROCESS AND DEVICE FOR APPLYING PLIABLE
TAPES TO IRREGULAR SURFACE
Filed Dec. 12, 1966
5 Sheets-Sheet 5
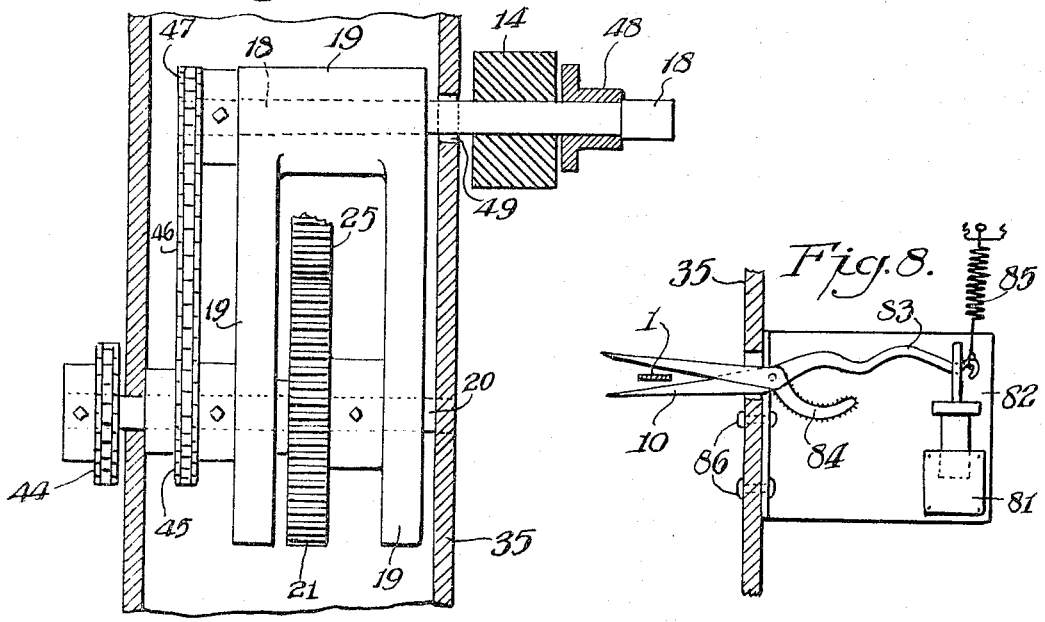
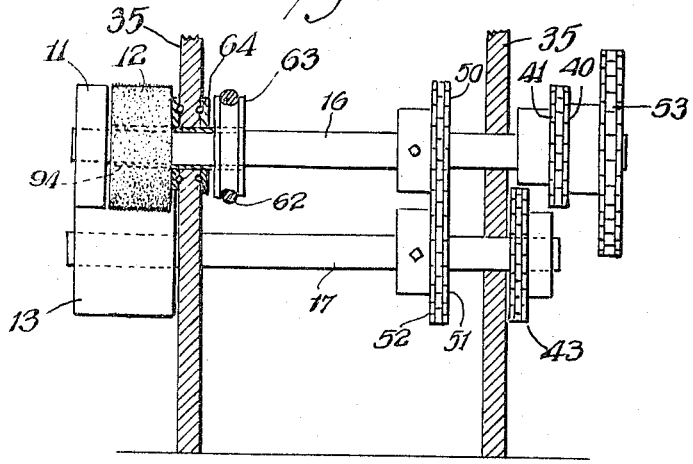
INVENTOR
Martin E. Cupery
BY Connolly and Hutz
ATTORNEYS United States Patent Office 3,328,219
Patented June 27, 1967

3,328,219
PROCESS AND DEVICE FOR APPLYING PLIABLE TAPES TO IRREGULAR SURFACES
Martin E. Cupery, 7 Crestfield Road, Wilmington, Del. 19803
Filed Dec. 12, 1966, Ser. No. 601,059
10 Claims. (Cl. 156—187)

ABSTRACT OF THE DISCLOSURE

Pliable tape, such as unsintered polytetrafluoroethylene (Teflon) is applied to an irregular surface, such as screw threads, by feeding the tape between the surface and a brush. The brush strokes against the tape to adhere the tape to the surface until at least one circumferential layer of tape is applied. The brush bristles act to deform the tape, where necessary to conform to the surface geometry of the irregular surface.

Brief summary of invention

This invention relates to an improved process for applying soft, pliable tapes of fluorinated organic polymers to the outer surface of cylindrical objects having an irregular or threaded surface, and to a mechanical device for carrying out this process. More particularly, the invention relates to an improved process and device for applying at least one circumferential layer of unsintered polytetrafluoroethylene tape to the male threaded section of pipe fittings, bolts, lag screws and the like.

The advantages derived from the use of films or ribbons of unsintered tetrafluoroethylene polymer as a sealant for threaded pipe joints have long been recognized industrially and are described in various publications, such as: Thompson and Nielsen in "Chemical Engineering" of November 1953, page 196, and Snedeker in "Chemical Engineering" of Oct. 6, 1958, page 154; news items in "Chemical Week" of Oct. 18, 1958, pages 50 and 52, and in "Chemical Engineering" of Sept. 4, 1961; and numerous other publications. The application of polytetrafluoroethylene (PTFE) tapes, by mechanical means, for example, to threaded pipe fittings, would have obvious advantages over ordinary manual operations for applying such tapes. However, the application of such tapes mechanically to rough or irregular surfaces of cylindrical objects has, thus far, been difficult to accomplish because of the slippery nature of PTFE tapes and their low order of adhesion to various types of surfaces.

An object of this invention is to provide a process and device for mechanically applying such tapes to irregular surfaces.

In accordance with this invention PTFE tapes and other soft pliable tapes of fluorinated organic polymers can be pressed readily onto and made to adhere to cylindrical objects having an irregular or threaded surface by bringing the tape into contact with such a surface and firmly stroking the tape onto the surface with a brush. It is preferred that the initial stroking action of the brush bristles against the tape be a firm lateral rubbing action so as to initiate good adhesion of the tape to the surface of the cylindrical object, followed by a more gentle rubbing action until at least one complete circumferential layer of the tape has been applied to the object. The brush bristles deform the tape so that the tape will conform to the irregular contour of the surface of the cylindrical object. This causes the tape to adhere to the depressed areas as well as to the elevated areas of the irregular surface. A brush having bristles of a suitable character is highly effective in accomplishing the above mentioned result because the bristles will bend and thereby produce a lateral stress and stroking action against the tape, to press the tape into the irregularities or indentations on the surface of the cylindrical object. Under such conditions, the tape has no tendency to cling to the bristles of the brush but adheres, instead, to the surface of the object.

The device for carrying out the above mentioned operation, comprises essentially (a) a power-driven circular wheel brush, (b) a group of power-driven support rollers for supporting and rotating the cylindrical object to which the tape is to be applied, with at least one of these rollers being adjustable to permit positioning of the cylindrical object with the section of the surface to be coated with tape in contact with the wheel brush, (c) means for feeding the tape into the bite formed by contact of the wheel brush with the cylindrical object when the latter is introduced into the device, (d) means for cutting the tape when the desired length has been applied, and (e) means for starting and stopping rotation of the supporting rollers and the wheel brush and for regulating their speed.

Brief description of drawings

FIGURE 6 is a sectional end view taken along the line 6—6 of FIGURE 5.

FIGURE 7 is a sectional view taken along the line 7—7 of FIGURE 1.

FIGURE 8 is a sectional view of the tape cutting mechanism used as in the device of FIGURES 1–7.

Detailed description

Figure 1:
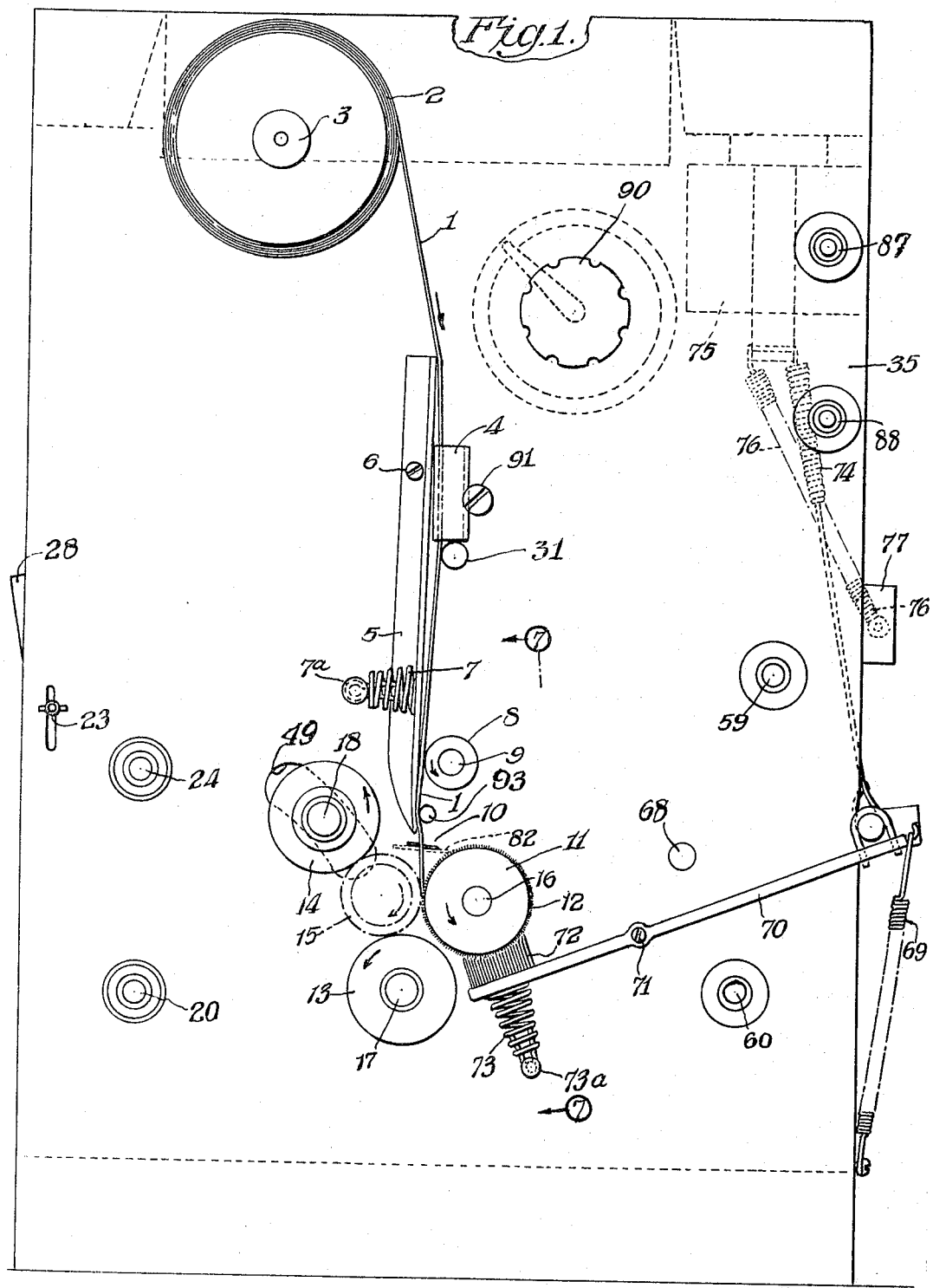
FIGURE 1 is a front view of a device in accordance with this invention.

The scale used for the drawings of the device of this invention is ⅗ of the full size. Although this represents an average size device, larger or smaller units may also be made without departing from the spirit of this invention.

This description concerns the application of a ¼ inch wide, 3 mil thickness, unsintered PTFE tape to a male threaded pipe fitting of ¾ inch internal diameter. The fitting 15 is held in position between rollers 11, 13 and 14 (FIGURE 1) by lifting roller 14 (attached to shaft 18 and frame 19 of FIGURES 5 and 6) which is movable along slot opening 49, so that fitting 15 may be inserted between these support rollers. Fitting 15 is held in place by the tension of a spring, to be described later, attached to the frame 19 which supports the movable roller 14. When the pipe fitting 15 is inserted and held in this way, the support rollers 11, 13 and 14 are normally rotating at a synchronized low rotational rate. Fitting 15 thus also rotates at the same peripheral linear rate as the supporting rollers. The electrical switch 87 is now pressed in order to activate roller 8, release the brush brake 72 and start the rotation of wheel brush 12 as later described. When activated, wheel brush 12 normally operates at a peripheral linear speed which is from four to about six times the peripheral linear speed of the rotating fitting 15. The tape 1, supplied from roll 2 rotating on shaft 3 (FIG. 1), is moved downward thru guide tube 4 (held by pin 91) by the rotational action of roller 8. When the tape 1 reaches the junction point or bite between the fitting 15 and wheel brush 12, the tape is rubbed against the threaded surface of fitting 15 because of the appreciably higher peripheral speed of the wheel brush 12 compared with the peripheral speed of fitting 15. When sufficient tape has been applied in this manner, so as to apply from about one-fourth to one-half of the total circumferential length of tape, the electrical switch 87 is released to terminate its electrical contact. This will stop the rotation of roller 8 but the tape will continue to move downward by slipping thru between roller 8 and the support plate 5, due to the pulling action of the tape as it adheres to the surface of the rotating fitting 15. When switch 87 is released, the brush brake 72 stops the rotation of wheel brush 12 so that the latter then serves to gently rub tape 1 into the threaded surface of fitting 15 as it continues to rotate. At a proper point in the rotation of fitting 15, electrical switch 88 is pressed momentarily thereby activating cutter 10 (FIGS. 1 and 8) momentarily. This will cut the tape 1 so that it is no longer pulled downward. The cutting of the tape 1 will be regulated so that its final length will be sufficient to give at least a slight overlapping of the tape as it is applied. Since the wheel brush at this stage of the tape application is essentially stationary, the final length of the cut tape will be applied smoothly to fitting 15 to produce a tight overlapping of the tape. In some cases, it is advantageous to allow fitting 15 to rotate for one or more additional rotations in order to give a tighter and smoother application of tape 1. When the tape 1 has been applied as above, fitting 15 can again be removed from the device by raising support roller 14 away from the fitting 15 and then removing the latter.

Figure 2:
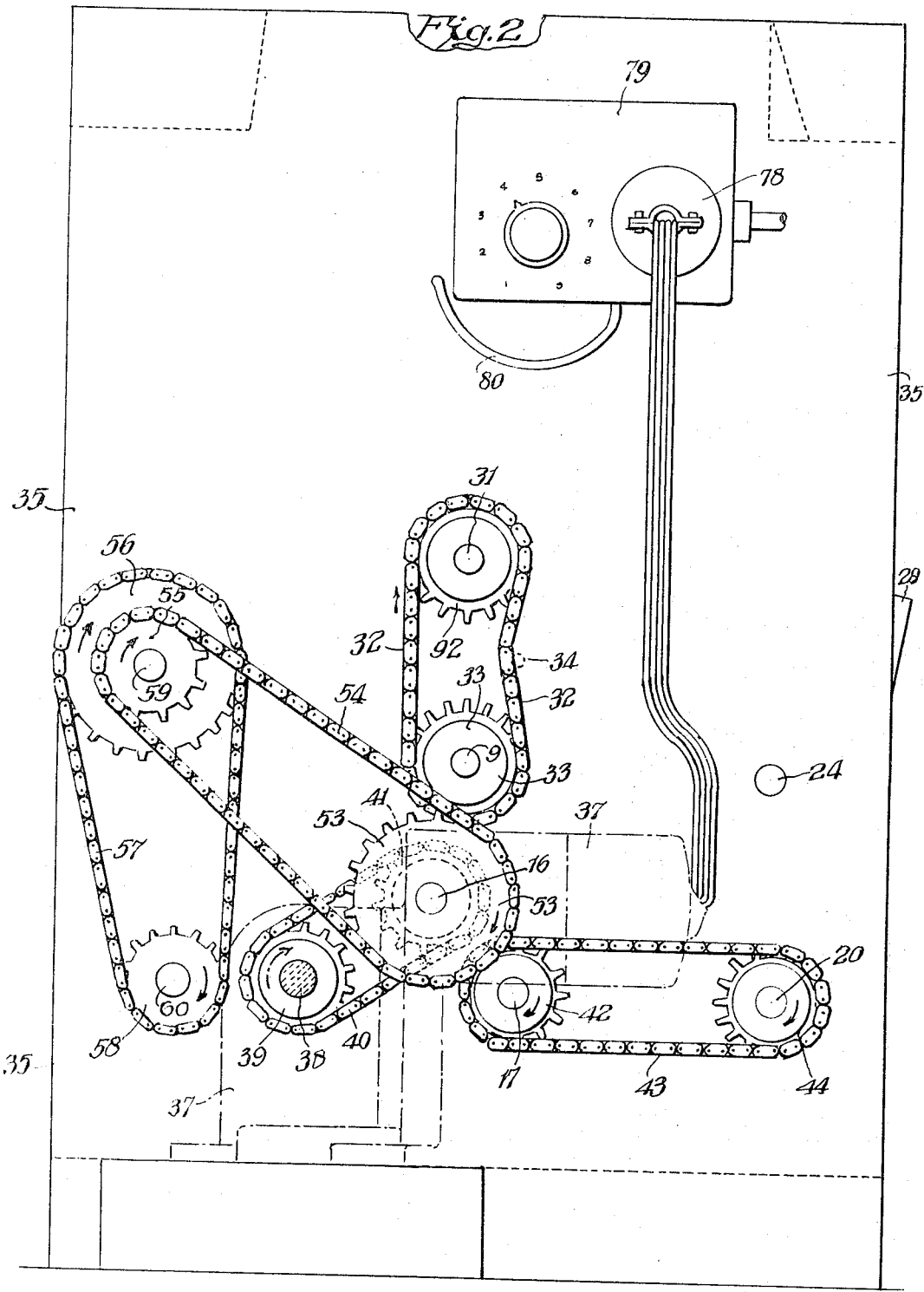
FIGURE 2 is a rear view of the device shown in FIGURE 1.
Figure 3:
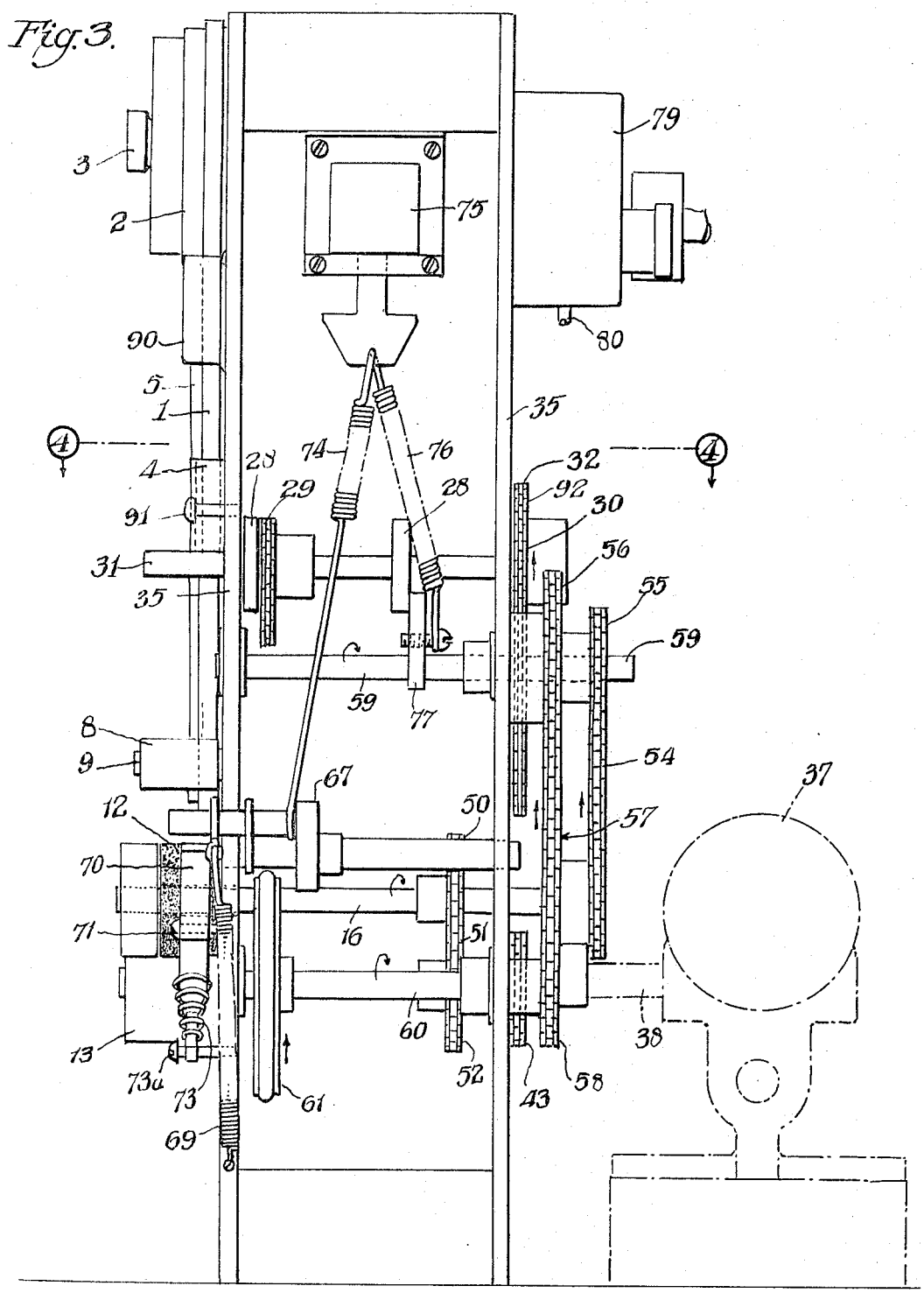
FIGURE 3 is an end view taken from the right side of FIGURE 1.

Reference is now made to FIGURE 3 which shows the electric motor with an attached gear reduction unit 37 and its power drive shaft 38. A suitable power unit is a 1/15 H.P. Dayton Electric Motor unit, model 4K871, with a gear reduction to 50 r.p.m., available from the Dayton Electric Company of Chicago, Ill. The motor unit and the corresponding rotational speed of shaft 38 can be controlled by a silicon rectifier unit, such as unit KG–201 available from Allied Radio Corporation of Chicago, Ill. This unit 79 (FIGURES 2 and 3) has a connecting electrical plug 78 (FIGURE 2) for motor 37 (FIG. 3) and a line source 80 for 60 cycle, 110 volt electric current. The frame 35 which supports the various parts essential to the operation of the device, may be made of plywood, plastic materials, metal, or other suitable support material. The various shafts of the device normally rotate on roller bearings or bronze bearings supported by frame 35 as shown in the drawings.

Figure 5:
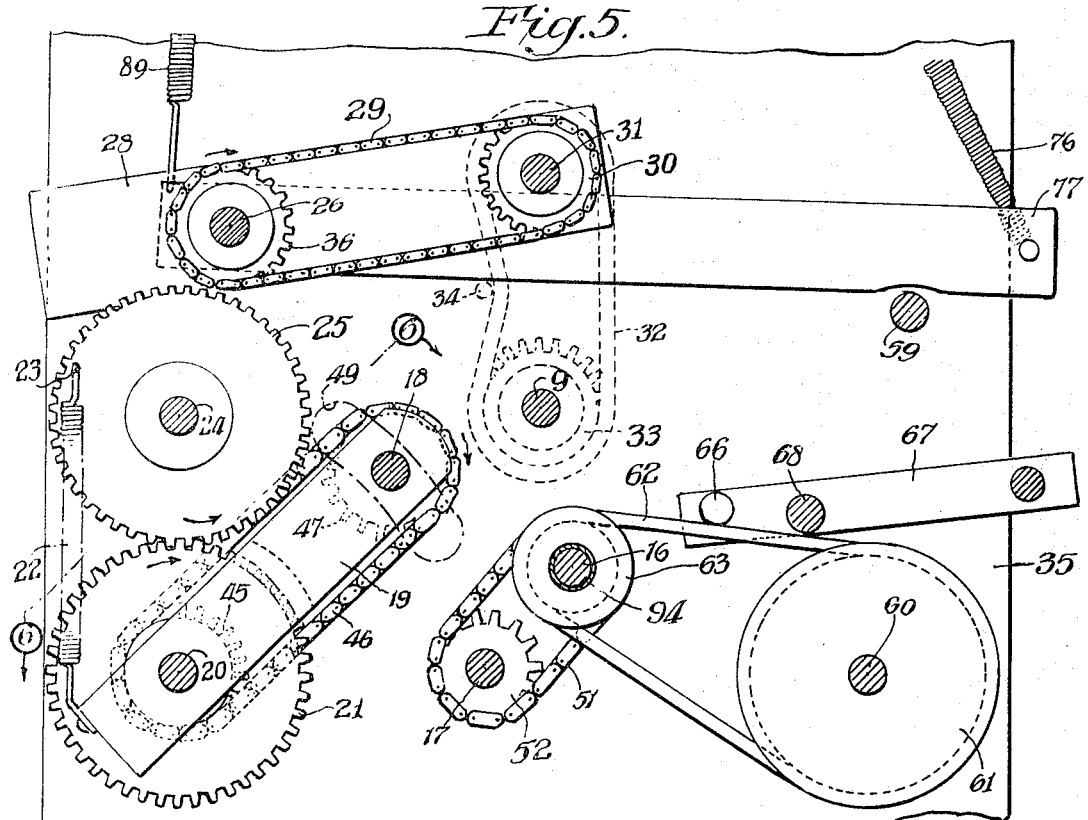
FIGURE 5 is an elevation view in section taken along the line 5—5 of FIGURE 4.

Shaft 38 operates sprocket 39 in a clockwise rotation as viewed on FIGURE 2. Sprocket 39, by means of chain 40, drives sprocket 41 (FIGS. 2 and 7). Sprocket 41, being attached to shaft 16, causes sprockets 50 and 53, and roller 11 (FIGS. 1 and 7) to be operated in the same clockwise rotation as viewed on FIGURE 2. It is important to note that the wheel brush 12 and pulley 63 (FIGS. 3 and 7) are attached to a separate tubular bearing shaft 94 (FIG. 7) supported by roller bearing 64 (FIG. 7) so that the rotation of wheel brush 12 and pulley 63 is independent of the rotation of shaft 16 which passes thru and is thus not connected with the tubular bearing shaft 94. Sprocket 50, by means of chain 51, operates sprocket 52 and, thereby also operates shaft 17, support roller 13 (FIGS. 3 and 7) and sprocket 42 (FIGS. 2 and 7). Since sprockets 41, 50 and 51 (FIGS. 2 and 7) are all of the same size, support rollers 11 and 13 which have equal diameters, will operate at the same peripheral linear speed. Shaft 17 (FIG. 2) which operates sprocket 42 (FIGS. 2 and 7) by means of chain 43, also operates sprocket 44 and shaft 20 (FIG. 2) at an equivalent rotational rate. Shaft 20 operates gear 21 and, thereby, also gear 25 attached to shaft 24 (FIG. 5). Shaft 20 also operates sprocket 45 (FIGS. 5 and 6) and, by means of chain 46, operates sprocket 47 (FIGS. 5 and 6) attached to shaft 18, at an equal rate. Shaft 18, held by frame 19 (FIG. 6) operates the movable, "floating" support roller 14 in a counter-clockwise rotation as viewed on FIGURE 1. Shaft 18 rotates freely within the bushing 48 (FIG. 6) which serves as a handle for moving shaft 18 along the slotted opening 49 (FIGS. 1, 5 and 6) either away from or toward support rollers 11 and 13 and wheel brush 12 (FIG. 1). A tension spring 22 (FIG. 5) tends to pull the frame assembly 19 downward compressing roller 14 against fitting 15. The tension of spring 22 is adjustable by raising or lowering the setting of the spring terminal at pin 23 (FIGS. 1 and 5).

When motor unit 37 is in operation, the equal diameter support rollers 11, 13 and 14 are all in motion at a synchronized rotation rate. A change in the position of support roller 14 (FIGS. 1 and 6) by means of handle 48, or by inserting fitting 15, does not change the uniform operation of roller 14. The cylindrical object 15 placed within the triangular area between rollers 11, 13 and 14, will be held in place by the pressure of roller 14 under the urging or tension of spring 22 (FIG. 5). The object thus held in position, will rotate at the same peripheral linear speed as that of the supporting rollers 11, 13 and 14.

Figure 4:
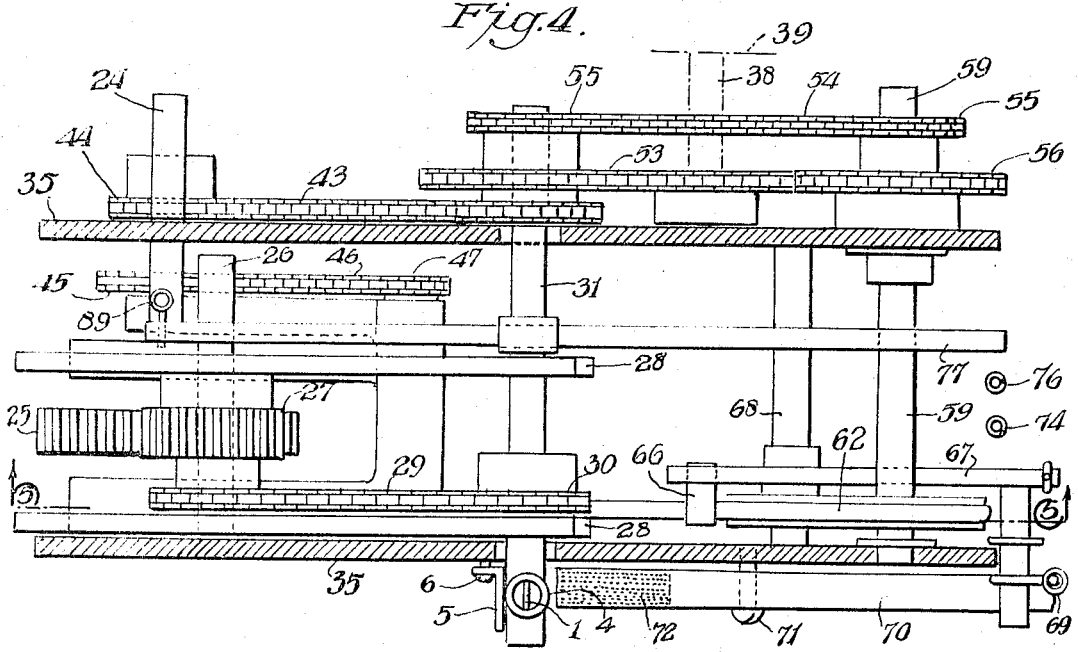
FIGURE 4 is a plan view in section taken along the line 4—4 of FIGURE 3.

Roller 8, which is attached to shaft 9, supplies tape from the supply role 2 whenever roller 8 becomes activated. In its downward movement (as shown in FIGURE 1), the tape 1 passes thru guide tube 4, between guide plate 5 and roller 8 and, finally, between guide plate 5 and pin 93. Guide plate 5 is held in place by the fulcrum screw 6 while the compression spring 7 which is held by screw 7a, presses guide plate 5 against roller 8. Roller 8 has slightly less than one-half the circumference of roller 11, 13 and 14. Roller 8, attached to shaft 9, is operated by sprocket 33 which is also attached to shaft 9 (FIG. 2). Sprocket 33, by means of chain 32, is driven by sprocket 92 (FIG. 2). For optimum smoothness in operation, the drive chains should be held in a snug position by an adjustable pin, such as pin 34 (FIGS. 2 and 5) when required. Shaft 31 is driven by sprocket 30 (FIGS. 4 and 5) which, in turn, is driven by sprocket 36 attached to shaft 26, with chain 29 serving as the drive chain. Shaft 26 is driven by gear 27 (FIG. 4). Gear 27 operates only when it is engaged with gear 25, which is in continuous operation under normal operating conditions.

As shown in FIGURES 4 and 5, gear 27 is held in a "floating" position by frame 28 which has its axis centered on shaft 31. The tension spring 89 serves to hold frame 28 suspended so that normally gear 27 is slightly removed from contact with gear 25. However, when the solenoid 75 (FIG. 3) is activated by closing the pressure switch 87 (FIG. 1), the tension spring assembly 76 attached to lever 77 (FIGS. 3, 4 and 5) is drawn upward against shaft 31, so that gear 27 is then moved downward and thus engaged with gear 25. When solenoid 75 (FIG. 3) is again deactivated by opening switch 87, the tension of spring 89 again disengages gear 27 from contact with gear 25. When gear 27 is thus disengaged, roller 8 again becomes stationary. The stoppage of roller 8, under normal operating conditions, does not terminate the downward movement of tape 1 whenever an initial length of the tape has been applied to the rotating fitting 15. As long as tape 1 has not been cut, by the cutting mechanism 10 (FIGS. 1 and 8), the tape will continue to be drawn downward between guide plate 5 and roller 8 because of the rotation of fitting 15 to which the tape adheres.

When roller 8 has a smaller circumference than the support rollers 11, 13 and 14, the gear 27 should have a correspondingly lower circumference compared with gear 25. This will allow a linear tape movement which will be very nearly equal to the peripheral linear speed of the fitting 15 and of the support rollers 11, 13, and 14.

The above described mechanical procedure is correlated with the mechanical movement of the wheel brush 12, as described below. Shaft 38 (FIG. 2) of the power unit 37, drives the larger sprocket 53 attached to shaft 16, by means of sprockets 39 and 41 and the chain connection 40 (FIGS. 2 and 7). Sprocket 53, by means of chain 54, drives both the smaller sprocket 55 and the larger sprocket 56 (FIG. 2), both of these sprockets being fastened to shaft 59. The larger sprocket 56, by means of chain 57, drives the smaller sprocket 58 which is attached to shaft 60 (FIG. 2). Shaft 60 operates the larger internal pulley 61 (FIGS. 3 and 5). Pulley 61, by means of belt 62 (FIG. 5), drives the smaller pulley 63. Pulley 63, in turn, is connected to the wheel brush 12 by means of the tubular shaft 94 and thus serves to drive the wheel brush. It will be evident that whenever motor unit 37 is in operation, all of the mentioned drive sprockets 39, 41, 53, 55, 56, and 58 shown in FIGURE 2 and the pulley 61 (FIG. 5) will be in continuous operation. The peripheral linear speed of the wheel brush 12 will be much higher than the peripheral linear speed of the support rollers 11, 13 and 14 because of the size difference between sprockets 53 and 55, 56 and 58, and pulleys 61 and 63 (FIGS. 2 and 5). When the solenoid 75 is activated by pressing switch 87, the spring assembly 74 will raise frame 67 and lever 70 by pulling against the tension of spring 69. The frame 67, which has a fulcrum point at shaft 68, will move roller 66 (FIGS. 4 and 5) downward against belt 62, thereby exerting a tightening action on this belt. Under normal conditions when solenoid 75 is not activated, there is enough slack in belt 62 so as to allow slippage of the belt around pulley 63 as long as the brush brake 72 remains applied against the wheel brush 12 (FIG. 1). When frame 67 and lever 70 are pulled upward by means of solenoid 75, lever 70 with its fulcrum point at pin 71, will release the brush brake 72 by pulling against the compression of the compression spring 73, held by pin 73a, and the tension of the tension spring 69 (FIG. 1). When solenoid 75 is inactive, the springs 69 and 73 serve to essentially stop the rotation of the wheel brush 12 by applying the brake 73 and allowing a slack in the drive belt 62.

The wheel brush 12 has a total diameter which is somewhat larger than the individual diameters of support rollers 11, 13 and 14, so that the brush bristles can exert a lateral stroking or rubbing action on the surface of fitting 15 or on the surface of the tape applied thereto. For example, when the support rollers 11, 13, and 14 have a diameter of 1.5 inches, the wheel brush should have a total diameter of about 1¾ inches. Normally such a wheel brush has bristles which are made of nylon fibers of about 0.010 inch diameter and are about ⅜ inch in length.

The length of the tape 1 that is applied to the fitting 15 is controlled by the cutter unit 10 (FIGS. 1 and 8). This cutter unit is operated by means of the actions of solenoid 81 and tension spring 85. When the electrical switch 88 (FIG. 1) is pressed so as to make an electrical contact, the solenoid 81 is activated, thereby closing the scissor blades 10 and thus cutting the tape 1. As soon as the switch 88 is released, the solenoid 81 is deactivated and the tension spring 85 again draws the scissor blades into an open position. Plate 82 (FIG. 8) serves to support the entire cutter unit and is attached to the machine structure frame 35 by means of bolts 86. Cutter arm 83 is movable and is attached to the solenoid arm, while arm 84 of the cutter device is in a fixed position since by being soldered or welded to the support plate 82.

FIGURE 1 shows a variable transformer 90 which may be used, if desired, to regulate the voltage applied to the solenoid coils of solenoids 75 and 81, which are shown in FIGS. 1 and 8. Solenoids operating at 110 volts A.C. are satisfactory but the use of somewhat lower voltages often has advantages in giving a smoother operation and prolonging the life period of the solenoid coils. Under average operating conditions, the voltage applied to the solenoids as described above, is between 75 and about 90 volts. The electrical connections involved in the above described mechanical device of this invention have not been included in the description or drawings since such connections are standard and readily obvious to those skilled in the art.

From the above detailed description, it is evident that the activation of solenoid 75 (FIG. 3) simultaneously accomplishes three essential mechanical functions: (a) starts the tape feed by activating roller 8, (b) increases the tension of belt 62 in order to drive pulley 63 and thereby wheel brush 12 and (c) releases the brush brake 72 so that wheel brush 12 is free to rotate. When solenoid 75 is deactivated all of these effects are reversed. Solenoid 81 serves only in activating the cutter.

The above described mechanical device of this invention has a particular advantage in that the fluorinated polymer tapes may be applied to a variety of cylindrical objects of different sizes and character, such as pipe fittings, machine bolts, and lag screws, without requiring any changes or modification of the device. It is evident that the size and diameter of the supporting rollers 11, 13 and 14 will determine to some extent the upper and lower limit of the size range of the cylindrical objects that can be accommodated by a particular device. For example, with support rollers 11, 13 and 14 of about 1.5 inches diameter, male threaded pipe fittings within the range of ¼ inch to 1 inch in diameter (I.D.) may be used interchangably for the application of PTFE tape. When fittings of larger sizes are to be treated with the tape, correspondingly larger support rollers will be required. For example, a larger mechanical device of this invention having support rollers of about 4 inches diameter will accommodate pipe fittings up to about 2.5 inches internal diameter. On the other hand, small support rollers of about ¾ inch diameter would be required for the mechanical application of the tapes to cylindrical objects of lower than about ¼ inch diameter.

It will be evident from FIGURES 3 and 7, that roller 11 has a lower width than support rollers 13 and 14. This is essential so as to allow for the position of the wheel brush 12 while also holding fitting 15 in a proper position during its rotation. The three suport rollers are preferably made of plastic materials or of rubber compositions. These rollers should be moderately firm but have sufficient resiliency so that the fitting 15 will not readily slip while being rotated. Rollers 13 and 14 can be tapered somewhat, for example, to give better conformity of the roller surface with the surface of a male threaded pipe fitting. The various rollers of the device of this invention may be cemented to the metallic drive shafts by means of plastic cement materials to avoid slippage on the shafts.

The wheel brush should have moderately flexible bristles of medium stiffness. Representative brushes that can be used, for example, are wheel brushes with a ½ inch arbor hole and a total diameter of about 1¾ inches, with nylon bristles of 0.008 inch to about 0.01 inch diameter and ⅜ inch to ½ inch in length. Larger or smaller wheel brushes may be used depending upon the general size of the mechanical device of this invention. Excessive stiffness of the bristles will tend to shred the polymer tape during its application to the fitting surface, while excessively soft bristles will tend to produce lower adhesion of the tape. The type and range of bristles which produce optimum results can easily be selected by those skilled in the art.

The rubbing or stroking action of the brush bristles against the polymer tape is accomplished by rotating the wheel brush against the tape at a peripheral linear speed which is initially appreciably higher than surface linear speed of the rotating cylindrical object to which the tape is applied. Normally, the peripheral linear speed of the wheel brush is within the range of about four to six times that of the cylindrical object. In the case of very thin tapes, such as PTFE tapes of 0.003 inch thickness, wheel brush/object speed ratio may be somewhat less than 4/1 with thicker tapes of about 0.005 inch thickness, however, the speed ratio should be about 6/1 or higher. It is clear that in any event, that the speed ratio of the wheel brush compared to the rotating cylindrical object must be greater than one and can even be as high as about 8:1 during the initial stage of the tape application. Speed ratios higher than 8:1 are generally not advantageous.

When the initial stroking action of the brush has been accomplished so that the initial length of the tape adheres to the surface of the cylindrical object, the remaining length of tape required is applied with the wheel brush held stationary, or in an essentially stopped position. In this way, the brush bristles continue to press the tape into the irregular or threaded surface of the cylindrical object as the latter continues to rotate. As explained previously above, the tape is cut mechanically at a proper point of rotation of the cylindrical object so that at least a slight overlapping of the ends of the applied tape will occur. It is important that at the instant that the tape is cut, the wheel brush should be essentially stationary or rotating at a peripheral linear speed which is appreciably less than that of the rotating cylindrical object so that the tape will not be pulled away from the surface of the cylindrical object to which it is applied. The wheel brush at the later stage of the tape application might even rotate in a reverse direction from its initial rotational direction.

Under proper conditions of operation, PTFE tapes and other tapes of similar character can be applied to all manner of cylindrical objects having a somewhat rough or indented surface. Such tapes will not adhere to very smooth surfaces, such as glass rods or tubes and polished metal tubes. The device and process of this invention is extremely useful for the application of unsintered polyfluorinated polymers and unsintered polytetrafluoroethylene in particular, in a pliable tape form to mechanically threaded metal or plastic fittings, such as pipe fittings, machine bolts, lag screws and the like. A very practical demonstration of this invention is the application of such tapes to cylindrical objects of fairly short length of about one to about twelve inches.

From the above description of the invention it is clear that the tape is normally applied to the end section of a cylindrical object and that the width of the tape application is largely dependent on the width of the tape that is used. The term cylindrical is meant to include both hollow (tubular) and solid (rod-like) objects made of metal, wood, paper, roughened glass, roughened ceramics or plastic materials. The designation rough or irregular surface is meant to refer broadly to any visibly nonuniform, nonsmooth surface having an irregular profile as well as to surfaces having uniform indentations, such as mechanically threaded pipe fittings, bolts, screws and the like. It is clear from the above description that all references to the rotation of the cylindrical objects refer to their rotation around their lengthwise axis and that the tapes are applied circumferentially as strips of at least one layer thickness, such a strip forming a ring of tape which is perpendicular to the axis of rotation.

Although the preferred method for applying the tape to the cylindrical object is by means of the mechanical device described above, the tape can also be applied manually by means of a brush. For this purpose, a flat brush having bristles of medium stiffness can be used to accomplish the required stroking action against the tape and thereby causing the initial length to adhere to the cylindrical body. The final length of the tape can then be applied with a less severe stroking action of the brush until a suitable overlapping of the tape has been obtained. However, such procedures are not as convenient and expedient as the use of a wheel brush as described above.

It is obvious that many variations and modifications of this invention are possible in light of this disclosure, without departing from the scope and nature of this invention. For example, an electric magnetic clutch and brake arrangement may be used in place of the belt tightener 66 and the brush brake 72 as illustrated herein. The electrical switch 87 might also be controlled automatically in its operation depending upon the positioning of roller 14 and the size of the fitting which is inserted between the support rollers.

The tapes or ribbons of the fluorinated polymers used in this invention must be soft and pliable so that they are easily deformed under the stroking action of the brush during its action against the tape thereby causing the tape to conform with and adhere to the surface to which it is applied. Such tapes normally have a thickness within the range of 0.002 to 0.006 inch but, in special cases, may range from as low as 0.001 to as high as 0.03 inch in thickness, depending mainly upon the nature and size of the cylindrical object to which the tape is applied. The width, diameter and nature of the wheel brush can be correlated to the width and the thickness of the tape that is applied. In general, the wheel brush should be somewhat wider than the width of the tape. The bristles should be of sufficient stiffness so as to deform the tape and produce a uniform application as explained previously above. Suitable PTFE tapes may vary from ⅛ inch to about 2 inches in width, although in general, tapes of about ¼ inch to about ¾ inch width have found wide usage where single or multiple layers of tape are applied, for example to threaded pipe fittings.

What is claimed is:

1. In a process for applying a soft pliable tape of an unsintered fluorinated polymer to an irregular surface of a generally cylindrical object comprising contacting an end of the tape against the irregular surface, and stroking the tape against the surface with a brush in a circumferential direction with respect to the object with sufficient force to cause adhesion of the tape to the surface until the tape is sufficiently anchored to the object.

2. The process of claim 1 wherein the tape is unsintered polytetrafluoroethylene, and the irregular surface is threaded.

3. The process of claim 1 wherein the object is rotated while the tape is applied, and the brush is initially simultaneously rotated at an appreciably higher speed than the object.

4. The process of claim 3 wherein the brush is initially rotated at from four to six times as fast as the object until the tape is sufficiently anchored thereto, the object then being rotated at a faster speed than the brush with the bristles of the brush pressing the tape against the object.

5. The process of claim 4 wherein the brush is rotated at the higher speed than the object until no more than one-half of a circumferential wrap of tape is applied to the object, the speed of the brush than being decreased so that the speed of the object is higher than the brush speed, and the speed of the object being substantially constant during both the initial and subsequent stages of the process.

6. A device for applying soft pliable tape of an unsintered fluorinated polymer to an irregular surface of a generally cylindrical object comprising support means for holding the object and rotating it about its longitudinal axis, and brush means for stroking against the tape with a sufficient force to cause the tape to intimately contact and adhere to the irregular surface.

7. The device of claim 6 wherein drive means are connected to said brush means for rotating said brush means at an appreciably higher speed than the speed of rotation of the object until the tape is sufficiently anchored to the surface, and feed means for disposing the tape near the irregular surface.

8. The device of claim 7 wherein said support means includes a plurality of power driven rollers, at least one of said rollers being adjustable to permit the object to be positioned between said plurality of rollers, and cutting means being positionable in the path of movement of the tape for cutting the tape when a sufficient amount has been applied to the object.

9. The device of claim 8 wherein said plurality of rollers comprises three triangularly arranged rollers, said brush means being a power driven brush coaxially mounted with one of said rollers for independent movement thereof, and rotational speed control means connected to said brush for reducing its rotational speed after the tape has been sufficiently anchored to the object whereby the object may rotate at a faster speed than said brush with the bristles of said brush continuing to apply pressure to the tape.

10. The device of claim 9 wherein said tape feed means includes guide means for controlling the path of movement of the tape, and switch means for controlling the starting and stopping of said rollers and said brush and their rotational speed and for controlling the activation and inactivation of said cutting means.

References Cited

UNITED STATES PATENTS

| 1,871,677 | 8/1932 | Ermold | 156—487 XR |
| 2,888,042 | 5/1959 | St. John et al. | 138—132 |
| 3,002,770 | 10/1961 | Chenut et al. | 285—94 |

EARL M. BERGERT, *Primary Examiner.*

J. P. MELOCHE, *Examiner.*